(12) United States Patent
Yang et al.

(10) Patent No.: US 11,435,903 B2
(45) Date of Patent: Sep. 6, 2022

(54) STORAGE CONTROLLER AND STORAGE DEVICE INCLUDING THE SAME AND OPERATING METHOD THEREOF

(71) Applicant: SAMSUNG ELECTRONICS CO., LTD., Suwon-si (KR)

(72) Inventors: Seungjun Yang, Hwaseong-si (KR); Kibeen Jung, Incheon (KR); Byeonghui Kim, Hwaseong-si (KR); Jungmin Seo, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 17/029,634

(22) Filed: Sep. 23, 2020

(65) Prior Publication Data

US 2021/0223954 A1 Jul. 22, 2021

(30) Foreign Application Priority Data

Jan. 22, 2020 (KR) .................. 10-2020-0008754

(51) Int. Cl.
*G06N 3/08* (2006.01)
*G06F 3/06* (2006.01)
*G06F 12/02* (2006.01)
*G06N 3/04* (2006.01)

(52) U.S. Cl.
CPC ............ *G06F 3/061* (2013.01); *G06F 3/0658* (2013.01); *G06F 3/0679* (2013.01); *G06F 12/0246* (2013.01); *G06N 3/04* (2013.01); *G06N 3/08* (2013.01); *G06F 2212/1016* (2013.01)

(58) Field of Classification Search
CPC ...... G06F 3/061; G06F 3/0658; G06F 3/0679; G06F 12/0246; G06F 2212/1016; G06F 3/064; G06F 3/0659; G06F 3/067; G06F 2212/7201; G06F 3/0604; G06F 3/0613; G06F 3/0626; G06F 3/0653; G06N 3/04; G06N 3/08; G06N 3/006; G06N 3/088; G06N 3/0454; G06N 20/00; G06K 9/6223; G06K 9/6276
See application file for complete search history.

(56) References Cited

U.S. PATENT DOCUMENTS 9,191,304 B1 * 11/2015 Plate .................. H04L 12/6418
10,095,613 B2 10/2018 Jo et al.
10,198,215 B2 2/2019 Lazo et al.
(Continued)

*Primary Examiner* — Tasnima Matin
(74) *Attorney, Agent, or Firm* — F. Chau & Associates, LLC

(57) ABSTRACT

The present disclosure provides an operating method of a storage controller. The operating method includes receiving user data and environmental information, obtaining logical-characteristic information and physical-characteristic information, defining a current state, obtaining expectation values, and performing a write operation. User data and environmental information is received from a non-volatile memory. The current state may be defined based on the logical-characteristic information and the physical-characteristic information. Expectation values may be obtained based on policy information and the current state. The write operation may be performed on the user data through a physical stream corresponding to a maximum value among the expectation values.

20 Claims, 10 Drawing Sheets

(56) References Cited

U.S. PATENT DOCUMENTS

| | | | |
|---|---|---|---|
| 2012/0110239 A1* | 5/2012 | Goss | G06F 12/0246 |
| | | | 711/103 |
| 2013/0325764 A1* | 12/2013 | Morimura | G06N 20/00 |
| | | | 706/14 |
| 2014/0359197 A1* | 12/2014 | Franceschini | G06F 3/061 |
| | | | 711/103 |
| 2016/0179386 A1* | 6/2016 | Zhang | G06F 3/0688 |
| | | | 711/103 |
| 2016/0266792 A1 | 9/2016 | Amaki et al. | |
| 2016/0291872 A1 | 10/2016 | Hashimoto et al. | |
| 2016/0306552 A1 | 10/2016 | Liu et al. | |
| 2017/0060479 A1* | 3/2017 | Hong | G06F 3/0659 |
| 2017/0075832 A1 | 3/2017 | Bhimani et al. | |
| 2017/0228157 A1 | 8/2017 | Yang et al. | |
| 2018/0203635 A1 | 7/2018 | Chen et al. | |
| 2018/0225553 A1 | 8/2018 | Ha et al. | |
| 2020/0193226 A1* | 6/2020 | Albaghajati | G06N 3/0454 |
| 2020/0393262 A1* | 12/2020 | Liu | G01C 21/3492 |
| 2021/0181941 A1* | 6/2021 | Bernat | G06F 3/0619 |

\* cited by examiner (a)

| PHYSICAL STREAM #1 | | | PHYSICAL STREAM #2 | | | LOGICAL STREAM | | |
|---|---|---|---|---|---|---|---|---|
| Overwritten Ratio #1 | Valid Page Count #1 | LBA Range #1 | Overwritten Ratio #2 | Valid Page Count #2 | LBA Range #2 | Average Page Size | Bandwidth | LBA Range #0 |

STORAGE CONTROLLER AND STORAGE DEVICE INCLUDING THE SAME AND OPERATING METHOD THEREOF

CROSS-REFERENCE TO RELATED APPLICATION

This application claims the benefit of Korean Patent Application No. 10-2020-0008754, filed on Jan. 22, 2020, in the Korean Intellectual Property Office, the disclosure of which is incorporated by reference herein in its entirety.

BACKGROUND

The inventive concept relates to storage controllers, and more particularly, to storage devices including the storage controllers, and operating methods of the storage controllers.

A storage device is an apparatus used to store information in a computer. A hard-disk drive, solid-state drive, and flash memory are examples of storage devices. Storage devices can be organized into a storage array, with multiple storage devices. Storage controllers are used to manage the storage devices in a storage array, deciding which storage device a write data to and read data from.

An artificial neural network (ANN) is a computational system designed to mimic the biological system of neurons. Machine learning is a field of artificial intelligence related to using an ANN. Machine learning generates new information by inputting data into a computer, and updating parameters of an ANN based on the data. Deep learning refers to training an ANN with multiple networks, or layers.

In some cases, storage controllers may perform stream classification to improve efficiency. However, conventional stream classification increases the development complexity, and is not suitable for responding to a wide variety of internal situations. This reduces the performance of the storage device. As a result, there is a need in the art to implement an ANN and deep learning methods into a storage controller for increased performance read and write operations.

SUMMARY

The inventive concept provides a storage controller capable of increasing performance indicators such as a write amplification factor (WAF), void page count (VPC), throughput, etc. by performing multi-stream classification using reinforcement learning, and a storage device including the storage controller, and an operating method of the storage controller.

According to an aspect of the inventive concept, there is provided an operating method of a storage controller including receiving user data and environmental information of a non-volatile memory; obtaining logical-characteristic information and physical-characteristic information; defining a current state based on the logical-characteristic information and the physical-characteristic information; obtaining expectation values based on policy information and the current state; and performing a write operation on the user data through a physical stream corresponding to a maximum value among the expectation values.

According to another aspect of the inventive concept, there is provided a storage controller including a multi-stream manager configured to generate a stream ID; a characteristic information generator configured to receive user data and environmental information and generate logical-characteristic information and physical-characteristic information; and a reinforcement learning (RL) agent configured to control to define a current state based on the logical-characteristic information and the physical-characteristic information, obtain expectation values with respect to each of physical streams based on the current state and policy information with respect to a physical stream selectable in the current state, and perform a write operation on the user data through a physical stream corresponding to a maximum value among the expectation values.

According to another aspect of the inventive concept, there is provided a storage device including a first memory block and a second memory block; and a storage controller configured to transmit data to one of the first memory block and the second memory block according to a stream ID, wherein the storage controller is further configured to receive user data from a host device, receive environmental information from each of the first memory block and the second memory block, generate logical-characteristic information and physical-characteristic information, define a current state based on the logical-characteristic information and the physical-characteristic information, obtain expectation values with respect to a selection of the first memory block and the second memory block based on the current state and policy information, and perform a write operation on the user data through a memory block corresponding to a maximum value among the expectation values.

According to another aspect of the inventive concept, a method of data storage includes receiving data to be stored in a memory; identifying a current state based on logical-characteristic information about the data and physical-characteristic information about an internal environment of the memory; classifying the data using a reinforcement learning agent trained to maximize a performance to the memory; and storing the data in the memory based on the classification of the data.

BRIEF DESCRIPTION OF THE DRAWINGS

Embodiments of the present disclosure of the inventive concept will be more clearly understood from the following detailed description taken in conjunction with the accompanying drawings in which:

FIG. 4 illustrates an example of a state function according to embodiments of the present disclosure;

DETAILED DESCRIPTION

The present disclosure relates to storage controllers. More particularly, the disclosure relates to storage devices including the storage controllers, and operating methods of the storage controllers. Embodiments of the disclosure use reinforcement learning applied to train a neural network for classifying a stream of input data for a storage device. In one example, both the characteristics of the input data and the characteristics of a physical stream are defined as a state, an action as to which physical stream is selected is defined, and a target performance indicator is defined as reward.

Reinforcement learning is one of three basic machine learning paradigms, alongside supervised learning and unsupervised learning. Specifically, reinforcement learning relates to how software agents make decisions in order to maximize a reward. The decision making model may be referred to as a policy. This type of learning differs from supervised learning in that labelled training data is not needed, and errors need not be explicitly corrected. Instead, reinforcement learning balances exploration of unknown options and exploitation of existing knowledge.

In some cases, reinforcement learning algorithms utilize dynamic programming techniques. However, one difference between reinforcement learning and other dynamic programming methods is that reinforcement learning does not require an exact mathematical model. Therefore, reinforcement learning models may be used for large models where exact methods are impractical.

In the context of a storage device, a reinforcement learning model may be used to classify a physical stream capable such that a storage controller may achieve a target performance indicator. The classification of various states may be selected by accumulating training data sets through multiple training courses and updating a policy based on the training data sets. As a result, performance of the storage device may be increased.

Hereinafter, embodiments of the present disclosure of the inventive concept will be described in detail with reference to the accompanying drawings.

Figure 1:
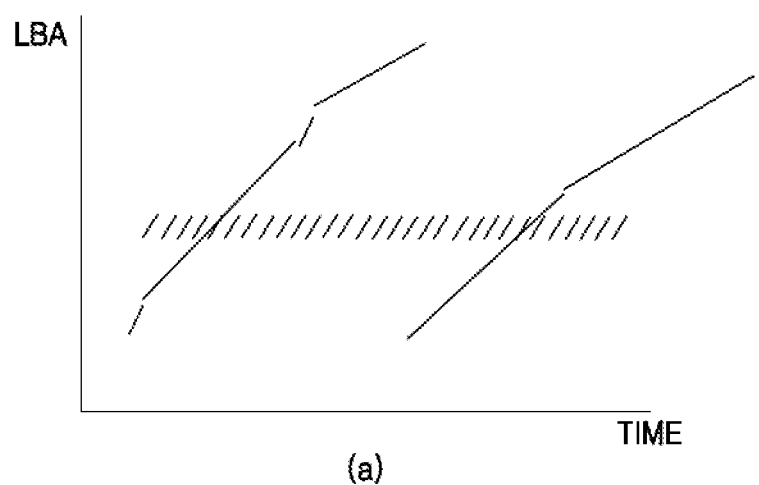
FIG. 1 is a graph illustrating an example of a logical stream.
Figure 1:
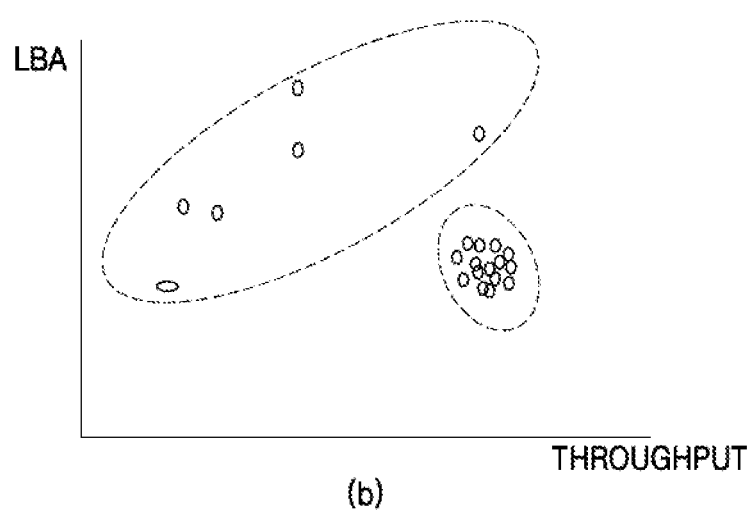

FIG. 1 is a graph illustrating an example of a logical stream.

The logical stream may refer to a set of data transmitted from a host device connected to a storage device. The logical stream may be referred to as a data stream according to various embodiments of the present disclosure. The criteria for distinguishing the set of data may include, for example, at least a logical block address (LBA) and a throughput.

Referring to FIG. 1, graph (a) shows LBA values of data input from the host device over time. Referring to graph (a), each of the data continuously input over time may constitute the logical stream. For example, each of a plurality of segments shown in graph (a) may correspond to one logical stream.

Referring to FIG. 1, graph (b) shows LBA values of the data input from the host device according to a processing speed. With reference to graph (b), data may be distinguished as two logical streams according to the processing speed and an LBA range. For example, the logical stream in the lower right may include data with relatively high processing speed and relatively small LBA value, and the logical stream in the upper left may include data with a low processing speed and a large LBA value.

When the storage device supports multi-streams, one stream included in the multi-streams may be referred to as a physical stream. Referring to FIG. 1, if the storage device supports multi-streams and the number of physical streams is multiple, the number of logical streams may be larger. In this case, a clustering problem may arise in that a plurality of logical streams may be classified and allocated into a limited number of physical streams may occur. For example, in the case of graph (a), there may arise the task of determining whether to allocate data with a short segment length (transmitted for a short time) to the same physical stream or to allocate data with similar LBA ranges to the same physical stream.

A machine learning clustering technique such as a K-th nearest neighbor (K-NN) technique or a K-Means technique may be applied to determine a physical stream to allocate the plurality of logical streams. However, a K-NN technique or a K-Means technique may include classifying data according to a similarity between transmitted data, and allocating data with similar characteristics to the same physical stream may not result in increased performance of a desired indicator, such as a write amplification factor (WAF) or a valid page count (VPC). Therefore, a plurality of logical streams may be clustered based on characteristics of data input in real-time and characteristics of a storage device, which will be described with reference to FIGS. 2 to 9 below.

Figure 2:
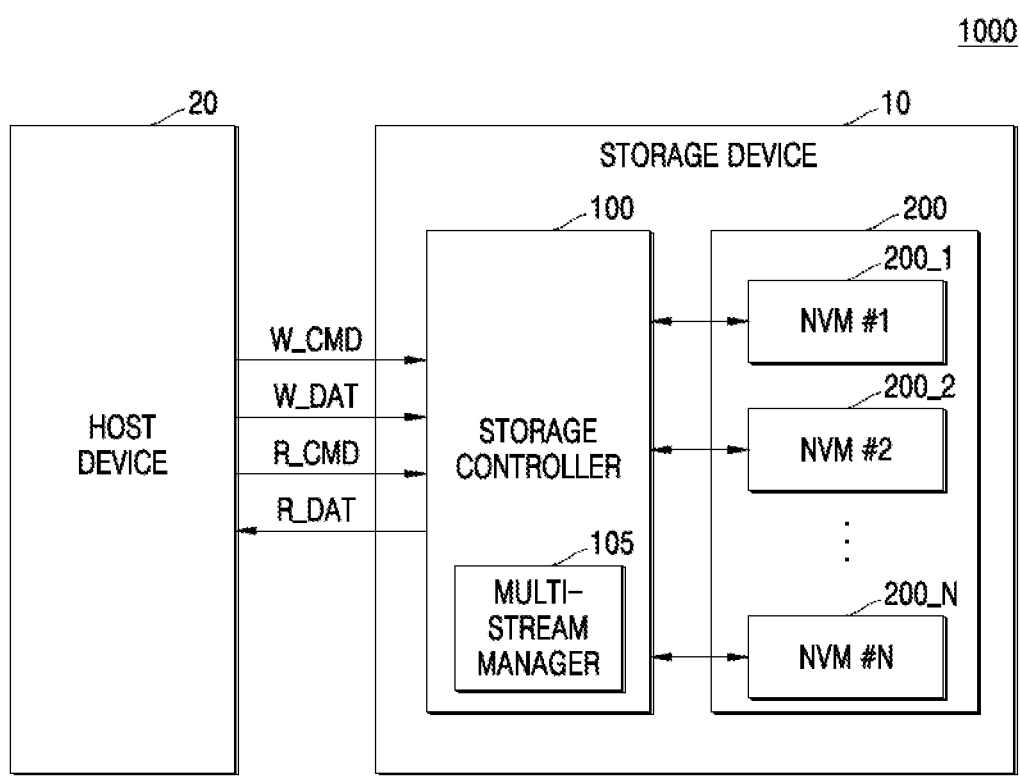
FIG. 2 is a block diagram illustrating a storage system according to embodiments of the present disclosure.

FIG. 2 is a block diagram illustrating a storage system 1000 according to embodiment of the present disclosure.

The storage system 1000 may be implemented as, for example, a personal computer (PC), a data server, a network-attached storage (NAS), an Internet of Things (IoT) device, or a portable electronic device.

According to various embodiments of the present disclosure, the portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, etc.

According to various embodiments of the present disclosure, a host device 20 may provide a command CMD to a storage device 10 and transmit and receive data DAT. For example, the host device 20 may provide the storage device 10 with a write command W_CMD and write data W_DAT. As another example, the host device 20 may transmit a read command R_CMD to the storage device 10 and receive read data R_DAT from the storage device 10.

According to various embodiments of the present disclosure, the host device 20 may include one or more processor cores. Additionally or alternatively, the host device 20 may also be implemented as a system-on-a-chip. For example, the host device 20 may include a general purpose processor, a dedicated processor, or an application processor. The host device 20 may be a processor itself, or may correspond to an electronic device or a system including the processor.

According to various embodiments of the present disclosure, the storage device 10 may include a storage controller 100 and a memory device 200. The memory device may include a plurality of non-volatile memories 200_1 (i.e., NVM #1) to 200_N (i.e., NVM #N), wherein N is an integer greater than 1. Each of the plurality of non-volatile memories 200_1 to 200_N may include a memory region for storing data provided from the host device 20. For example, each of the plurality of non-volatile memories 200_1 to 200_N may include a memory cell array formed along a plurality of word lines and a plurality of bit lines.

In an embodiment of the present disclosure, the storage device 10 may be an embedded memory embedded in the storage system (e.g., 1000 in FIG. 2). For example, the storage device 10 may be an embedded Multi-Media Card (eMMC) or an embedded Universal Flash Storage (UFS) memory device. In an embodiment of the present disclosure, the storage device 10 may be an external memory detachable from the storage system 1000. For example, the storage device 10 may be a UFS memory card, a Compact Flash (CF) card, a Secure Digital (SD) card, a Micro Secure Digital (Micro-SD) card, a Mini Secure Digital (Mini-SD) card, extreme Digital (xD), or a memory stick.

According to various embodiments of the present disclosure, each of the plurality of non-volatile memories 200_1 to 200_N may employ various kinds of memories such as a NAND-type Flash Memory, Magnetic RAM (MRAM), Spin-Transfer Torque MRAM, Conductive bridging RAM (CBRAM), Ferroelectric RAM (FeRAM), Phase RAM (PRAM), resistive RAM, nanotube RAM, polymer RAM (PoRAM), Nano Floating Gate Memory (NFGM), a holographic memory, a Molecular Electronics Memory, an Insulator Resistance Change Memory, etc.

According to various embodiments of the present disclosure, the storage controller 100 may generally control the storage device 10. According to an embodiment of the present disclosure, the storage controller 100 may include a multi-stream manager 105. The multi-stream manager 105 may classify the write data W_DAT transmitted from the host device 20 into a plurality of physical streams, based on the characteristics of the write data W_DAT and environmental information of each of the plurality of non-volatile memories 200_1 to 200_N. A detailed description of the multi-stream manager 105 will be described later with reference to FIGS. 3A to 9.

Figure 3A:
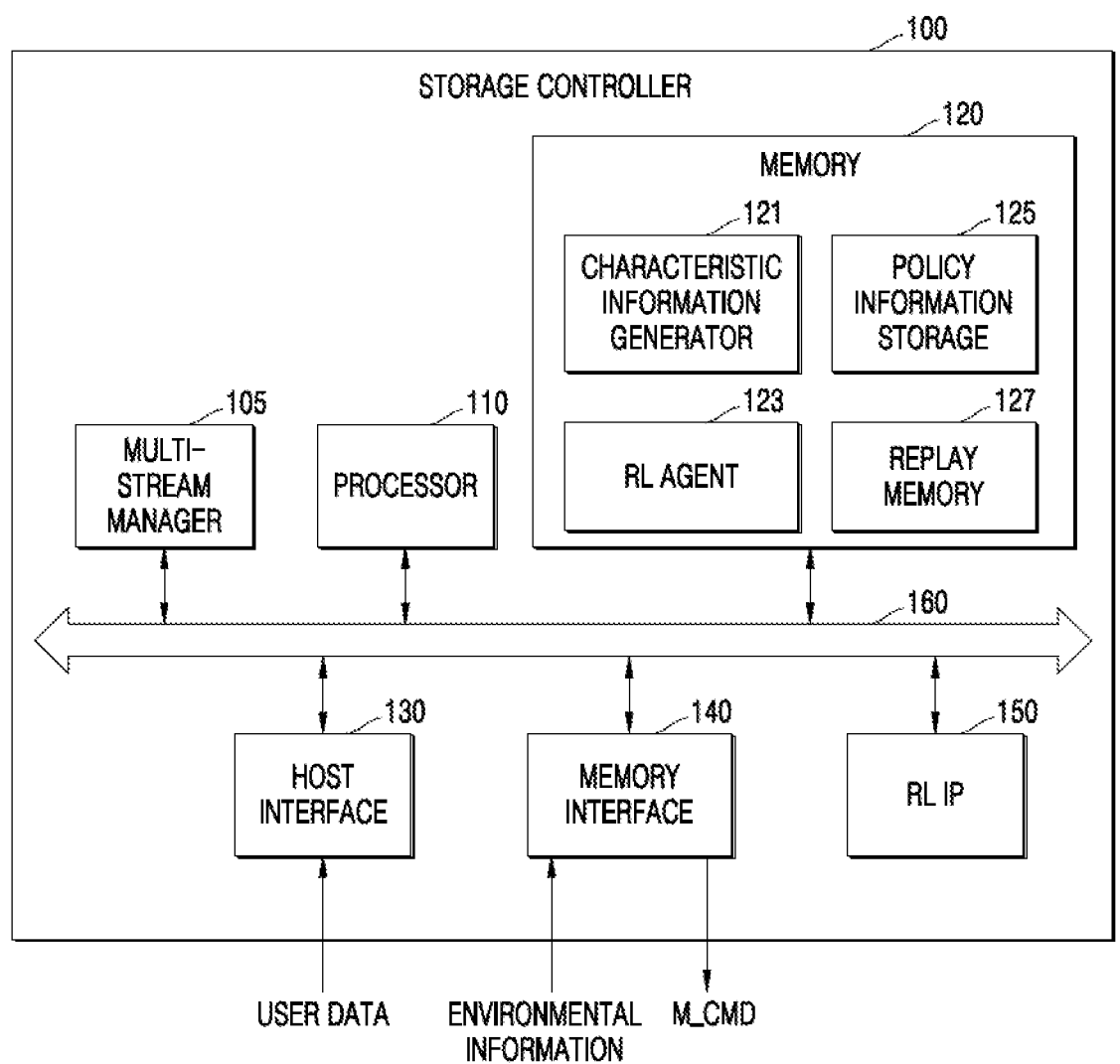
FIG. 3A is a block diagram of a storage controller according to embodiments of the present disclosure.

FIG. 3A is a block diagram of a storage controller according to embodiments of the present disclosure.

Referring to FIG. 3A, the storage controller 100 may include a processor 110, a memory 120, a host interface 130, a memory interface 140, and reinforcement learning (RL) intellectual property (IP) 150 (or also referred to as a hardware intellectual property unit). These components may communicate with each other through a bus 160, and in addition to the configurations as shown above, the storage controller 100 may further include other configurations.

According to various embodiments of the present disclosure, the processor 110 may control the overall operation of the storage controller 100. For example, the processor 110 may perform clustering on a logical stream received from the host device 20 by executing an RL agent 123.

The processor 110 may include a central processing unit or a micro processing unit. In an embodiment of the present disclosure, the processor 110 may be implemented as a multi-core processor, such as a dual-core processor or a quad-core processor.

The processor 110 may execute firmware for driving the storage controller 100. The firmware may be loaded into the memory 120 and executed. For example, the processor 110 may perform garbage collection for managing the plurality of non-volatile memories 200_1 to 200_N of FIG. 1 or a flash translation layer for performing address mapping, wear leveling, etc. by executing firmware for driving the storage controller 100.

The memory 120 may operate under the control of the processor 110. The memory 120 may be used as an operating memory, cache memory, or buffer memory of the processor 110. Software, firmware, and data for controlling the storage controller 100 may be loaded in the memory 120. The memory 120 may be implemented as a volatile memory such as dynamic random access memory (DRAM) or static random access memory (SRAM). Alternatively, the memory 120 may be implemented as a resistive memory such as RRAM, PRAM or MRAM.

According to various embodiments of the present disclosure, the host interface 130 may perform communication with the host device 20. For example, the host interface 130 may provide a physical connection between the host device 20 and the storage device 10. The host interface 130 may adjust the size of data exchanged with the storage device 10 or convert the format of commands exchanged with the storage device 10 in response to a transmission format of the host device 20, such as a bus format. The bus format of the host device 20 may be configured as at least one of Universal Serial Bus (USB), Small Computer System Interface (SCSI), Peripheral Component Interconnection (PCI) express, AT Attachment (ATA), Parallel AT Attachment (PATA), Serial AT Attachment (SATA), and Serial Attached SCSI (SAS). A non-volatile memory express (NVMe) protocol mounted on the host device 20 exchanging data by using PCI express may be applied to the host interface 130.

According to various embodiments of the present disclosure, the memory interface 140 may exchange data with a memory device 200. The memory interface 140 may write data to the memory device 200 via a channel CH, and read the data from the memory device 200 via the channel CH. For example, the memory interface 140 may transmit model information to the memory device 200 through the channel CH, and may receive the model information from the memory device 200 through the channel CH.

The memory device 200 may include a flash memory, and the flash memory may include a 2D NAND memory array or a 3D (or vertical) NAND (VNAND) memory array. The 3D memory array is a circuit associated with arrays of memory cells with an active region disposed on a silicon substrate, or operations of the memory cells and is formed monolithically on the substrate or at least one physical level of a circuit formed in the substrate. The term "monolithic" means that layers of each level constituting the array are stacked directly above the layers of each lower level of the array. In an embodiment of the present disclosure, the 3D memory array includes vertical NAND strings arranged in a vertical direction such that at least one memory cell is located above the other memory cell. The at least one memory cell may include a charge trap layer.

U.S. Pat. Nos. 7,679,133, 8,553,466, 8,654,587, and 8,559,235, and U.S. Patent Application Publication No. 2011/0233648 describe appropriate configurations of a 3D memory array including a plurality of levels and sharing word lines and/or bit lines between the levels, and may be combined herein in the cited documents.

According to various embodiments of the present disclosure, the memory 120 may include a characteristic information generator 121, an RL agent 123, a policy information storage 125, and a replay memory 127.

According to various embodiments of the present disclosure, the characteristic information generator 121 may obtain characteristic information of a logical stream based on user data transmitted from the host device 20. Hereinafter, the characteristic information of the logical stream will be referred to as logical-characteristic information.

The logical-characteristic information may refer to information about characteristics of a stream of the data transmitted from the host device 20. For example, the logical-characteristic information may include at least one of LBA range information, bandwidth information, and average page size information. The LBA range information, the bandwidth information, and the average page size information are example values. The logical-characteristic information is not limited thereto. The logical-characteristic information may include any information that may represent the data stream received from the host device 20. For another example, the logical-characteristic information may include information such as at least one of a request size and an interval time.

According to various embodiments of the present disclosure, the characteristic information generator 121 may obtain information of a physical stream based on environmental information transmitted from the plurality of non-volatile memories 200_1 to 200_N. Hereinafter, the characteristic information of the physical stream will be referred to as physical-characteristic information.

The physical-characteristic information may refer to information about the internal environment of a non-volatile memory. For example, the physical-characteristic information may include at least one of overwritten ratio information, valid page count (VPC) information, and LBA range information of written data. However, the VPC information, the overwritten ratio information, and the LBA range information are example values, and the physical-characteristic information is not limited thereto. The physical-characteristic information may include any information that may represent characteristics of the data stored in the non-volatile memory. For another example, the physical-characteristic information may include at least one of the number of super blocks, sequential address ratio (SAR) information, terabyte written (TBW) information, the number of bad blocks, a read/write request ratio, information indicating whether to align an LBA range, and size information of the LBA range.

According to various embodiments of the present disclosure, the RL agent 123 may generate a neural network or train a neural network, learn a policy based on a training data set, and receive expectation values of received input data based on the learned policy. For example, the RL agent 123 may receive information about a current state, and the information about the current state may include the physical-characteristic information and/or the logical-characteristic information. The RL agent 123 may output a plurality of expectation values corresponding to the current state based on policy information. Thus, the current state may correspond to an environment, and the plurality of expectation values may correspond to a decision of the RL agent 123.

In various embodiments of the present disclosure, RL may refer to a machine learning method of learning an action to perform in a current state. When an action is performed, a reward is provided, and learning may progress to maximize a reward. In some cases, the model is trained to maximize a cumulative reward. In RL, even if the reward value is small, the model may learn to select an action that increases cumulative reward values over time. In some cases, future rewards may be modified based on a discount rate obtained by converting the reward value to be obtained in the future into a present value.

Certain embodiments use a form or reinforcement learning known as Q-learning. Q-learning is a model-free reinforcement learning algorithm that learns a policy for determining an action that an agent should take given a current state of its environment. Q-learning does not require a model of the environment, and it can handle problems with stochastic transitions and rewards. In some cases, Q-learning is based on a finite Markov decision process (FMDP), and finds an optimal policy by maximizing the expected value of a total reward over any and all successive steps, starting from the current state. Q-learning can identify an optimal action-selection policy for any given FMDP, given infinite exploration time and a partly-random policy. The "Q" refers to the quality function that returns the reward based on the action taken, and therefore is used to provide the reinforcement.

Figure 3B:
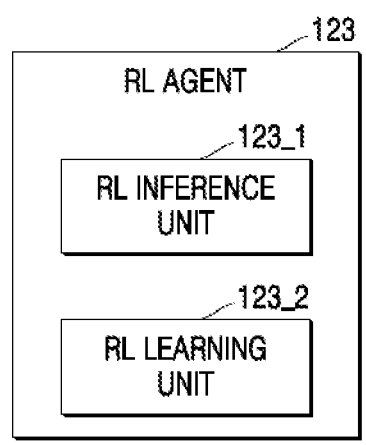
FIG. 3B is a block diagram of a reinforcement learning (RL) agent according to embodiments of the present disclosure.

Additionally or alternatively, referring to FIG. 3B, an RL inference unit 123_1 of the RL agent 123 may output a plurality of expectation values, wherein the expectation values correspond to the current state based on the policy information stored in the policy information storage 125. The number of expectation values may correspond to the number of physical streams in a multi-stream. For example, when the storage device 10 supports two physical streams, the expectation values may be two.

In some embodiments, the RL agent 123 include or incorporate information from an artificial neural network (ANN). An ANN is a hardware or a software component that includes a number of connected nodes (a.k.a., artificial neurons), which loosely corresponds to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by maximizing the reward function). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

An ANN may include various types of models including a Convolution Neural Network (CNN), Region with Convolution Neural Network (R-CNN), Region Proposal Network (RPN), Recurrent Neural Network (RNN), Stacking-based deep Neural Network (DNN), State-Space Dynamic Neural Network (S-SDNN), Deconvolution Network, Deep Belief Network (DBN), Restricted Boltzmann Machine (RBM), Fully Convolutional Network, Long Short-Term Memory (LSTM) Network, Classification Network, Deep Q-Network (DQN), Double DQN, Dueling DQN, Distribution Reinforcement Learning, Multi-Step Learning, Prioritized Experience Replay (PER), Noisy DQN, Categorical DQN, and Rainbow DQN such as GoogleNet, AlexNet, VGG Network, etc. but is not limited thereto.

Certain Q-learning systems use a deep convolutional neural network (CNN), with layers of tiled convolutional filters to mimic the effects of receptive fields. In some cases, reinforcement learning can be unstable or divergent when a nonlinear function approximator such as a neural network is used to represent Q. This instability is based on correlations present in the sequence of observations. For example, small updates to Q may significantly change the policy, the data distribution, and the correlations between Q and the target values. Thus, Deep Q-learning (DQN) techniques may utilize experience replay, a biologically inspired mechanism that uses a random sample of prior actions instead of the most recent action to proceed. This reduces correlations in the observation sequence and smooths changes in the data distribution. Iterative updates adjust Q towards target values that are only periodically updated, further reducing correlations with the target.

In some examples, DQN models also utilize a target network to fix parameters of the target function. In some examples, a clipping reward technique is used to replace all positive rewards with a same value, and all negative rewards with a different value. In some examples, a skipping frames technique is used to calculate a Q value at periodic intervals to reduce computational cost.

The policy information storage 125 may store the policy information generated by the RL agent 123. The policy information is information for selecting one action capable of maximally increasing reward among a plurality of actions corresponding to the current state. For example, the policy information may include a quality function (i.e., a Q function).

According to various embodiments of the present disclosure, the policy information may be updated. Referring to FIG. 3B, an RL learning unit 123_2 may learn a policy based on the training data set, and the newly learned policy may be transferred to the policy information storage 125.

According to various embodiments of the present disclosure, the RL learning unit 123_2 may use the replay memory 127 to prevent confirmation bias. The replay memory 127 may reduce correlation between training data input to the RL learning unit 123_2 through uniform random sampling from the training data set. The replay memory may be implemented as one of a ring buffer, a circular buffer, and a cyclic memory buffer.

According to various embodiments of the present disclosure, the RL IP 150 may include one or more processors to accelerate operations performed by models of the neural network. Also, the RL IP 150 may include a separate memory storing a program corresponding to the models of the neural network. For example, the processor may correspond to a neural network processing unit (NPU), and may include a fixed function engine for executing a convolution layer and a programmable layer for executing a non-convolution layer. As another example, the processor may be implemented as at least one of a Graphical Processing Unit (GPU) for high-speed parallel processing, and an Application Specific Integrated Circuit (ASIC)-based Tensor Processing Unit (TPU) for parallel processing of vector and matrix operations.

According to various embodiments of the present disclosure, the RL IP 150 may be referred to as various terms, including a neural network processing device, a neural network integrated circuit, a neuromorphic computing unit, or a deep learning device.

FIG. 4 illustrates an example of a state function according to an embodiment of the present disclosure. Hereinafter, for convenience of description, the case where the number of multi-streams supported by the storage device 10 is two will be described. However, the embodiment of the present disclosure of the inventive concept is not limited thereto, and it will be apparent that the embodiment of the present disclosure may be applied to the storage device 10 supporting at least three multi-streams.

Referring to FIG. 4, the state function may include logical-characteristic information and physical-characteristic information.

Characteristic information corresponding to logical streams may include an average page size, a bandwidth, and LBA range #0. The physical-characteristic information may include first physical-characteristic information and second physical-characteristic information. The first physical-characteristic information may refer to information of the first memory block 200_1 corresponding to a first physical stream (physical stream #1). The second physical-characteristic information may refer to information of the second memory block 200_2 corresponding to a second physical stream (physical stream #2). The first physical-characteristic information may include LBA range #1, VPC (i.e., Valid Page Count #1), and overwritten ratio information (i.e., overwritten ratio #1) corresponding to the first memory block 200_1. The second physical-characteristic information may also include corresponding LBA range #2, VPC (i.e., Valid Page Count #2), and overwritten ratio information (i.e., overwritten ratio #2) corresponding to the second memory block 200_2.

According to an embodiment of the present disclosure, the processor 110 or the characteristic information generator 121 of FIG. 3A may transmit a monitoring command M_CMD to the plurality of non-volatile memories 200_1 to 200_N. The monitoring command M_CMD may be a command requesting environmental information of each of the plurality of non-volatile memories 200_1 to 200_N. Each of the plurality of non-volatile memories 200_1 to 200_N may transmit environmental information to the storage controller 100 in response to receiving the monitoring command M_CMD. The environmental information may include at least one of the overwritten ratio information, the VPC, the LBA range of the write data W_DAT, a read/write request ratio, a SAR, and the number of super blocks. The characteristic information generator 121 may generate physical-characteristic information with respect to each of the plurality of non-volatile memories 200_1 to 200_N based on the received environmental information.

Referring to FIG. 4, the physical-characteristic information includes three pieces of information such as the LBA range, the VPC, and the overwritten ratio, but is not limited thereto. The characteristic information generator 121 may use information included in the environmental information as the physical-characteristic information.

According to an embodiment of the present disclosure, the processor 110 and/or the characteristic information generator 121 may not transmit the monitoring command M_CMD to the plurality of non-volatile memories 200_1 to 200_N but may transmit the monitoring command M_CMD to at least some of the plurality of non-volatile memories 200_1 to 200_N. For example, when data has been determined to have been transmitted through the first physical stream in the past state, the internal environment of the second memory block 200_2 corresponding to the second physical stream may not change. Accordingly, the processor 110 or the characteristic information generator 121 may transmit the monitoring command M_CMD to the first memory block 200_1.

Referring to FIG. 4, the logical-characteristic information includes three pieces of information of average page size, bandwidth, and LBA range information, but is not limited thereto. The characteristic information generator 121 may use request size information and interval time information as the logical-characteristic information in addition to the three pieces of information.

According to an embodiment of the present disclosure, the characteristic information generator 121 may bypass generating the logical-characteristic information and receive the logical-characteristic information from the host device 20. For example, the host device 20 may drive software of a separate prediction model for data transferred to the storage device 10. The prediction model may extract the average page size, the bandwidth, the LBA range, the interval time information, etc. based on the data stream transferred to the storage device 10. Additionally or alternatively, the prediction model may transfer the average page size, the bandwidth, the LBA range, the interval time information, etc. to the processor 110 or the characteristic information generator 121 of the storage controller 100.

The characteristic information generator 121 may receive the logical-characteristic information, the first physical-characteristic information, and the second physical-characteristic information, and configure a state function corresponding to the current state. The state function may be transferred to the RL learning unit 123_2 or the RL inference unit 123_1 of the RL agent 123.

Figure 5:
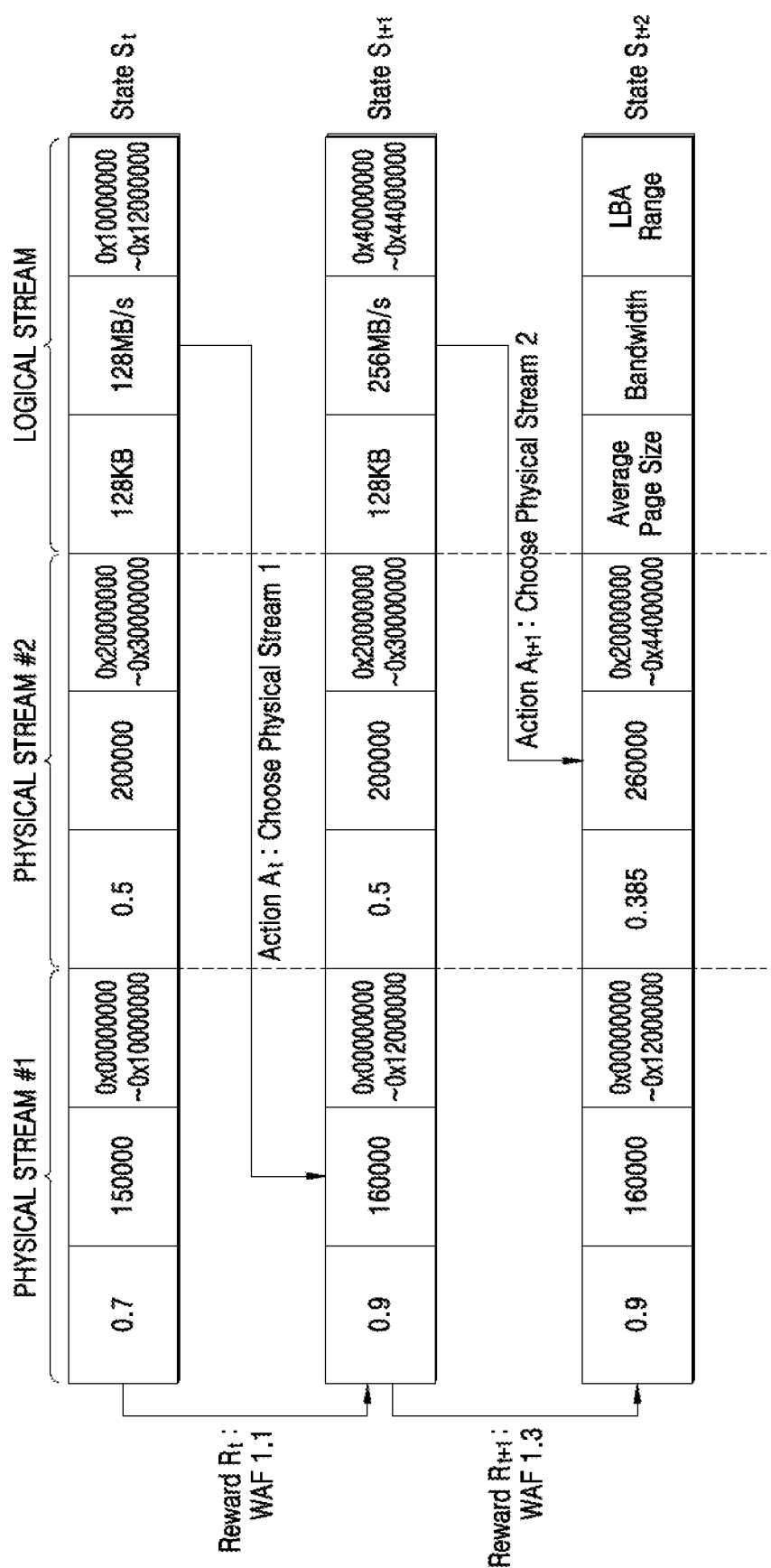
FIG. 5 illustrates an example of a state function progression according to embodiments of the present disclosure.

FIG. 5 illustrates an example of a state function progression according to an embodiment of the present disclosure.

Referring to FIG. 5, a state $S_t$, a state $S_{t+1}$, and a state $S_{t+2}$ are shown.

In the state $S_t$, the RL agent 123 may select a first physical stream, and the first memory block 200_1 may have a current overwritten ratio of 0.7, the VPC of 150000. The LBA range in which write data is stored of 0x00000000 to 0x10000000. Additionally or alternatively, the second memory block 200_2 may have a current overwritten ratio of 0.5, the VPC of 200000, and the LBA range in which the write data is stored of 0x20000000 to 0x30000000.

Hereinafter, will be described that the state $S_t$, the state $S_{t+1}$, and the state $S_{t+2}$ are included in a training section.

The RL agent 123 may randomly determine an action. The above action may refer to allocating a given logical stream to any physical stream.

As described above, because the state $S_t$ is included in the training section, the state $S_t$ may be a time when policy information is not present or generated. Therefore, the RL agent 123 may randomly determine the action. For example, the RL agent 123 may select a physical stream based on whether the LBA range is closed to. A continuous LBA range may be achieved when input data transmitted from the host device 20 is written to the first memory block 200_1 as the LBA range of the input data is 0x10000000 to 0x12000000. The RL agent 123 may transmit action information in which a first physical stream is selected to the processor 110. The processor 110 may control to add a stream identification (ID) or a tag indicating the first physical stream to a logical stream corresponding to the state $S_t$.

According to various embodiments of the present disclosure, a reward corresponding to each state may be defined. The reward may indicate a target performance indicator that may change due to an action selection in any state. For example, the reward may include at least one of a WAF, a change in the VPC, a latency value, and a bandwidth value.

According to various embodiments of the present disclosure, the reward may have a positive value or a negative value. Whether the reward has the positive value or the negative value may be determined based on the target performance indicator. For example, the greater the WAF value, the greater the amount of additional write caused by a garbage collection. This may indicate a decrease in the performance of the storage device 10. When the WAF value is close to 1, because the storage device 10 does not need to perform the garbage collection, increased performance of the storage device 10 may be indicated. Accordingly, when the target performance indicator is the WAF, the magnitude of the reward may increase as the WAF value approaches 1. The magnitude of the reward may decrease or may have a negative value as the WAF value goes greater than 1.

As another example, when the target performance indicator is the VPC, the magnitude of the reward may decrease or have a negative value as the VPC increases. This is because when the VPC increases, the number of additional writes increases while performing the garbage collection. Therefore, when the target performance indicator is the VPC, the magnitude of the reward may be inversely proportional to the number of VPCs.

Referring to FIG. 5, physical-characteristic information and the WAF value of the first memory block 200_1 may change by selecting an action $A_t$ to allocate the logical stream as the first physical stream in the state $S_t$. The overwritten ratio may increase from 0.7 to 0.9, the VPC also may increase by 10000, and the LBA range of data written to the first memory block 200_1 may change from the LBA range 0x00000000 to 0x11000000 to the LBA range 0x00000000 to 0x12000000. The WAF value representing reward $R_t$ may change to 1.1.

In the state $S_{t+1}$, the RL agent 123 may select a second physical stream. As described above, because the state $S_{t+1}$ is also included in the training section, the RL agent 123 in the state $S_{t+1}$ does not determine the action based on the policy information, but may randomly select a physical stream to generate a training data set. For example, the RL agent 123 may select a second physical stream to have a different LBA range based on the logical stream. The processor 110 may receive action information from the RL agent 123 and add a stream ID or a tag to the logical stream corresponding to the state St. The stream ID or tag information may include information indicating the second physical stream.

Referring to FIG. 5, the overwritten ratio of the second memory block 200_2 may be lowered to 0.385. This is because the probability that the data included in the logical stream in the state $S_{t+1}$ is data not related to the data written to the second memory block 200_2 is high. Additionally or alternatively, as new data is written, the VPC may increase by 60000. Based on the changes in the overwritten ratio and the VPC, the reward $R_{t+1}$ of the action $A_{t+1}$ of the state $S_{t+1}$ may be reduced. This is because the WAF value increases from 1.1 to 1.3.

The RL agent 123 may perform learning by inputting characteristic information of each of the state $S_t$ and the state $S_{t+1}$ as training data, select the action information of the first physical stream and the second physical stream, and reward the information related to a change in the WAF value into the RL learning unit 123_2. The RL agent 123 may output expectation values of actions corresponding to the current state through the RL inference unit 123_1 when a sufficient amount of training data is input.

In the above-described embodiment of the present disclosure, the criteria for the reward corresponding to the target performance indicator is the WAF, but is not limited thereto.

According to various embodiments of the present disclosure, the reward may be based on a score obtained by measuring a plurality of performance indicators. The reward may be based on changes in the WAF and the VPC. In this case, weights may be different between the WAF and the VPC. For example, as a criteria used to evaluate the performance of the storage device 10, the weight may be adjusted to reflect the change of the VPC by 60% and the change of the WAF by 40%. Additionally or alternatively, the weights may be variable to be changed according to the policy of a user of the storage device 10 and an operator of the storage device 10.

Figure 6:
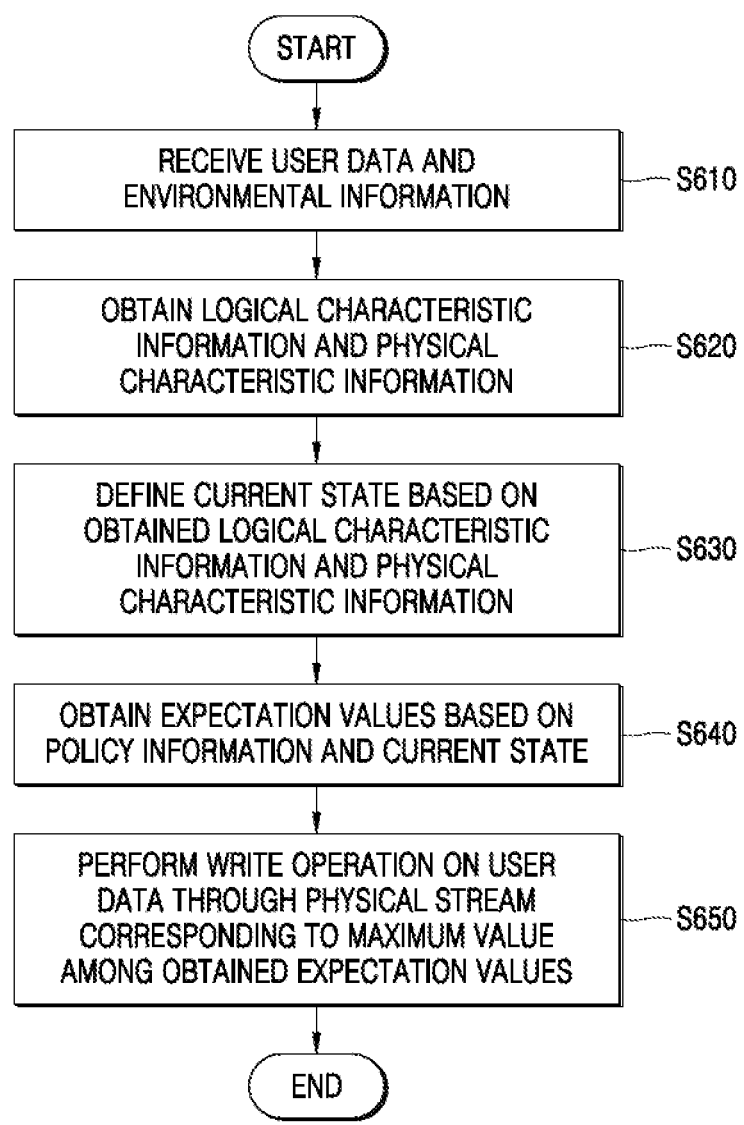
FIG. 6 illustrates an operating method of a storage controller according to embodiments of the present disclosure.

FIG. 6 illustrates an operating method of the storage controller 100 according to embodiments of the present disclosure.

Referring to FIG. 6, in operation S610, the storage controller 100 may receive user data and environmental information. The user data may refer to a data stream transmitted along with the write command W_CMD from the host device 20. The environmental information may correspond to information used to represent the internal state of each of the plurality of non-volatile memories 200_1 to 200_N.

In operation S620, the storage controller 100 may obtain logical-characteristic information and physical-characteristic information. The logical-characteristic information may include information about a logical stream, and the physical-characteristic information may include the information about the internal states of the plurality of non-volatile memories 200_1 to 200_N. The logical-characteristic information is characteristic information of the user data and may include at least one of an LBA range, a request size, an interval time, an average size, and a bandwidth. The physical-characteristic information may include at least one of an overwritten ratio, a VPC, the LBA range, an SAR, the number of superblocks, and the number of bad blocks.

The storage controller 100 may obtain the logical-characteristic information and the physical-characteristic information by using the characteristic information generator 121. According to an embodiment of the present disclosure, the processor 110 may transmit the monitoring command M_CMD requesting the environmental information from at least one of the plurality of non-volatile memories 200_1 to 200_N in response to a request of the characteristic information generator 121.

In operation S630, the storage controller 100 may define a current state based on the obtained physical-characteristic information and logical-characteristic information. For example, the current state may be determined by a combination of the internal states of the plurality of non-volatile memories 200_1 to 200_N and the characteristics of data to be written by a user.

In operation S640, the storage controller 100 may obtain expectation values based on policy information and the current state. The RL inference unit 123_1 of the storage controller 100 may output expectation values of each of actions selectable in the current state based on the policy information and the current state.

For example, when the storage device 10 supports four physical streams, the RL inference unit 123_1 may output first to fourth expectation values. The first to fourth expectation values may correspond to the four physical streams, respectively. For example, the processor 110 or the RL agent 123 may select which physical stream to allocate and store the write data W_DAT in the current state to increase a target performance indicator.

In operation S650, the storage controller 100 may write the user data through a physical stream corresponding to the maximum value among the obtained expectation values. The processor 110 or the RL agent 123 may identify the physical stream corresponding to the maximum value among the obtained expectation values. The processor 110 or the RL agent 123 may add tag information or stream ID information indicating the identified physical stream to the logical stream and perform the write command W_CMD on the logical stream.

Figure 7:
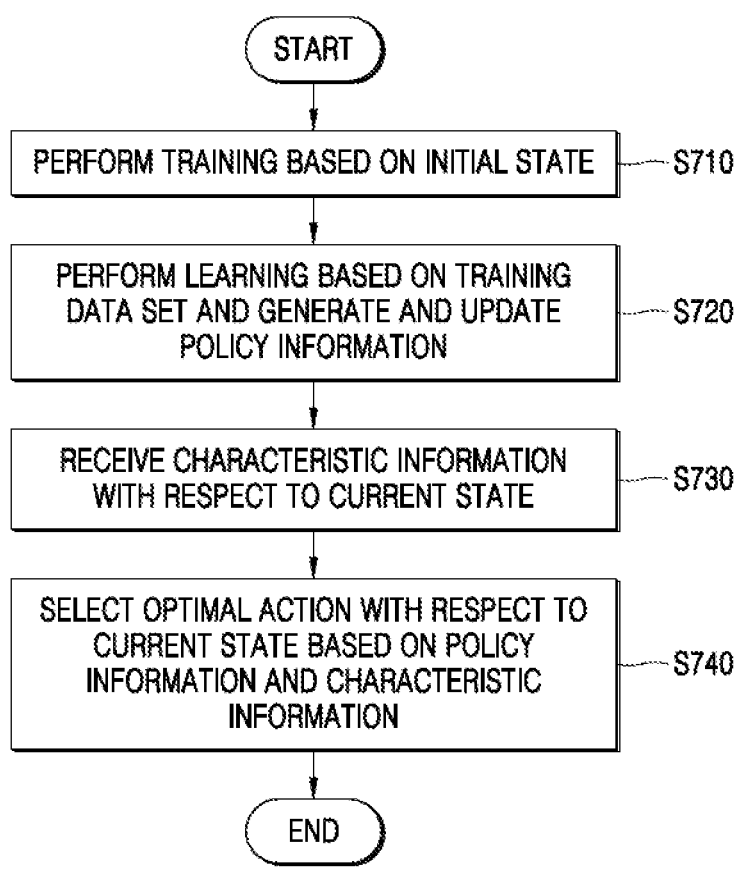
FIG. 7 illustrates an operating method of an RL agent according to embodiments of the present disclosure.

FIG. 7 illustrates an operating method of the RL agent 123 according to an embodiment of the present disclosure.

Referring to FIG. 7, in operation S710, the RL agent 123 may perform training based on an initial state. For example, the initial state may correspond to a state in which the storage device 10 is first used. Accordingly, characteristic information of the plurality of non-volatile memories 200_1 to 200_N may correspond to 0.

The RL agent 123 may repeat random action selection for a predefined period of time. The section length of the predefined period of time may be set to be a time sufficient to generate sample data used for learning. For example, the section length of the predefined period of time may be determined based on at least one of the size of a batch, a learning rate, the size of the replay memory 127, and the magnitude of the sample data.

In operation S720, the RL agent 123 may perform learning based on a training data set and generate and update policy information. The RL learning unit 123_2 may receive an input of the training data set and generate the policy information for outputting an expectation value with respect to the input. According to various embodiments of the present disclosure, the RL agent 123 may perform learning based on the training data set and repeatedly perform an operation of updating the policy information. By repeatedly updating the policy information, the policy information may effectively determine an action corresponding to the current state.

In operation S730, the RL agent 123 may receive characteristic information about the current state. The characteristic information may include physical-characteristic information of at least one non-volatile memory among the plurality of non-volatile memories 200_1 to 200_N and logical-characteristic information of user data. The detailed description of operation S730 is redundant with that of the operation S620 of FIG. 6, and therefore the detailed description will be omitted.

In operation S740, the RL agent 123 may select the action with respect to the current state based on the policy information and the characteristic information. The action may refer to selecting an action corresponding to a maximum expectation value among a plurality of actions that may be selected in the current state. The detailed description of operation S740 is redundant with that of operation S650 of FIG. 6, and therefore the detailed description will be omitted.

Figure 8:
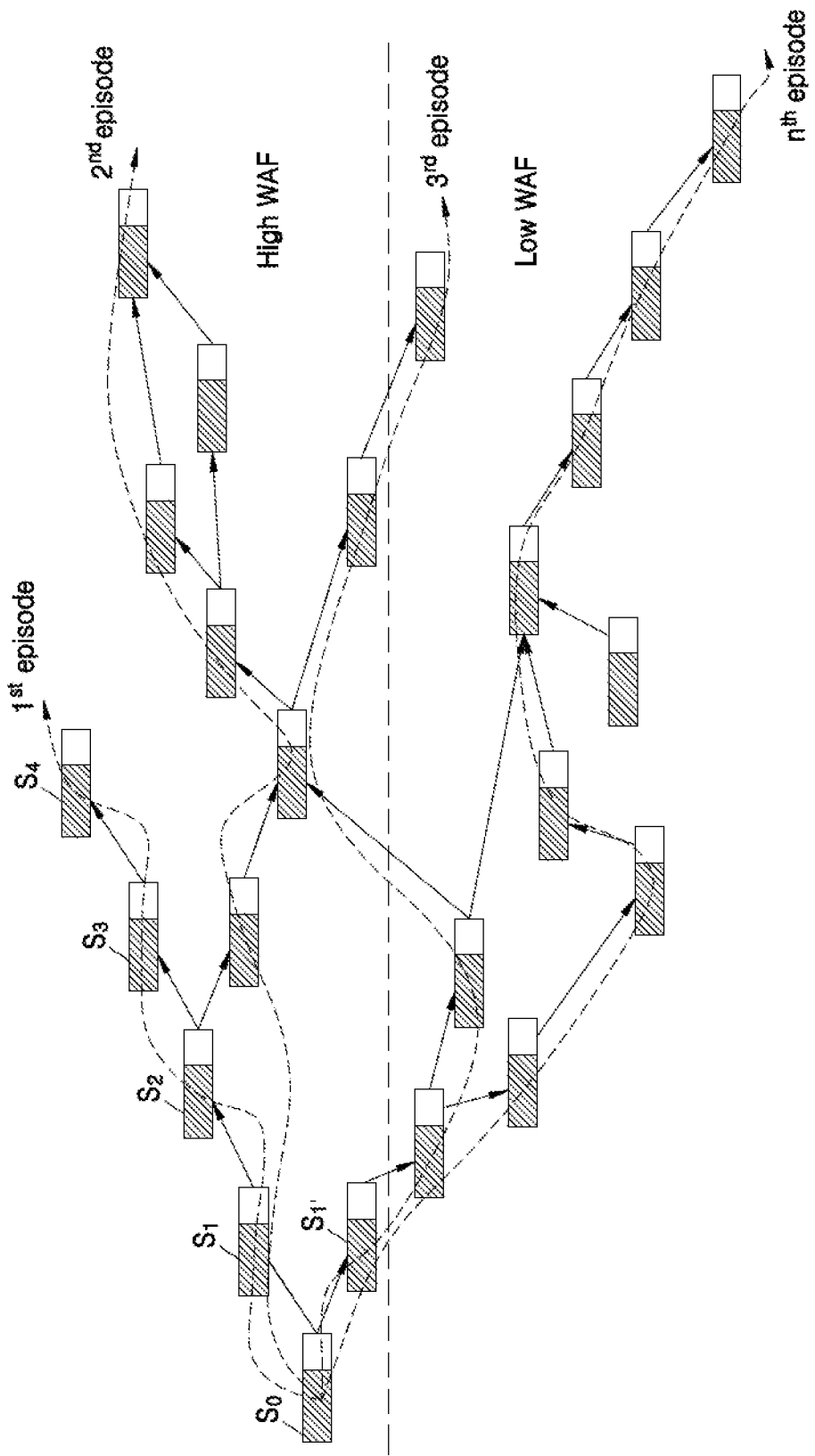
FIG. 8 illustrates an example of repeatedly performing RL according to an embodiment of the present disclosure.

FIG. 8 illustrates an example of repeatedly performing RL according to an embodiment of the present disclosure.

Referring to FIG. 8, the RL agent 123 may perform multiple episodes. During the episodes, the RL agent 123 may repeatedly select the action for a predefined period of time starting from an initial state $S_0$. The predefined period of time may be set to be a time sufficient to generate sample data used for learning. For example, the section length of the predefined period of time may be determined based on at least one of the size of a batch, a learning rate, the size of the replay memory 127, and the magnitude of the sample data.

According to various embodiments of the present disclosure, the RL agent 123 may proceed with a first episode. In the case of proceeding with the first episode, the RL agent 123 may select a random action and store a reward value because policy information used to determine the action is not present. Referring to FIG. 8, it may be confirmed that a WAF value further increases when the first episode ends. An increase in the WAF value indicates that there are many additional write operations when performing a garbage collection, and a target performance indicator may deteriorate. For example, the magnitude of a reward may have a negative value.

The RL agent 123 may proceed with a second episode. When proceeding with the second episode, policy information for determining the action in a current state may already exist. The policy information may be policy information learned and generated by the RL learning unit 123_2 based on a training data set generated during the first episode. For example, when the second episode proceeds, the RL agent 123 may perform the selection based on the action and reward selected in the first episode. Referring to FIG. 8, it may be confirmed that the WAF value increases compared to the WAF value of the initial state $S_0$ at the time when the second episode ends. However, it may be confirmed that the WAF value corresponding to the end time of the second episode decreases compared to the WAF value corresponding to the end time of the first episode. For example, the RL agent 123 may decrease the WAF value and increase the reward by selecting the action according to the learned policy information based on the action and the reward of the first episode.

The RL agent 123 may proceed with a third episode. In the case of proceeding with the third episode, policy information for determining the action in the current state may already exist. The policy information may be policy information learned and updated by the RL learning unit 123_2 based on the training data set generated during the second episode in addition to the first episode.

According to various embodiments of the present disclosure, policy information may be based on a search method such as an epsilon-greedy search method. For example, the search method may include randomly selecting actions according to a certain probability. As a result, local optimization due to bias may be prevented.

The term epsilon-greedy refers to a method to balance exploration and exploitation in reinforcement learning by choosing between exploration and exploitation randomly. Epsilon refers to the probability of choosing to explore. In some cases, exploitation is used most of the time with a small chance of exploring.

Referring to FIG. 8, it may be seen that in the first episode and the second episode, the RL agent 123 selects a first state $S_1$ as the action in the initial state $S_0$. For example, the RL agent 123 may select a physical stream with an LBA range adjacent to an LBA range of a logical stream. Moreover, in the third episode, the RL agent 123 may randomly select a $1^{st}$ state $S_1'$ as the action according to a certain probability. For example, the RL agent 123 may select a physical stream with an LBA range different from the LBA range of the logical stream. At the end of the third episode, it may be confirmed that the WAF value decreases from the WAF value of the initial state $S_0$. For example, the RL agent 123 may reduce the WAF value and increase a target performance indicator by selecting the action according to the learned policy information based on the action and reward of each of the first episode and the second episode.

The RL agent 123 may proceed with an nth episode. Here, n may be a positive integer with a large value. For example, n may be 1000. For example, the RL agent 123 may proceed with the nth episode while selecting the action to increase the target performance indicator by updating the policy information when performing the first to n–1th episodes. The WAF value corresponding to the end time of the n-th episode may be reduced compared to the WAF value of the initial state $S_0$.

Accordingly, a method of data storage may include receiving data to be stored in a memory; identifying a current state based on logical-characteristic information about the data and physical-characteristic information about an internal environment of the memory; classifying the data using a reinforcement learning agent trained to maximize a performance to the memory; and storing the data in the memory based on the classification of the data.

Figure 9:
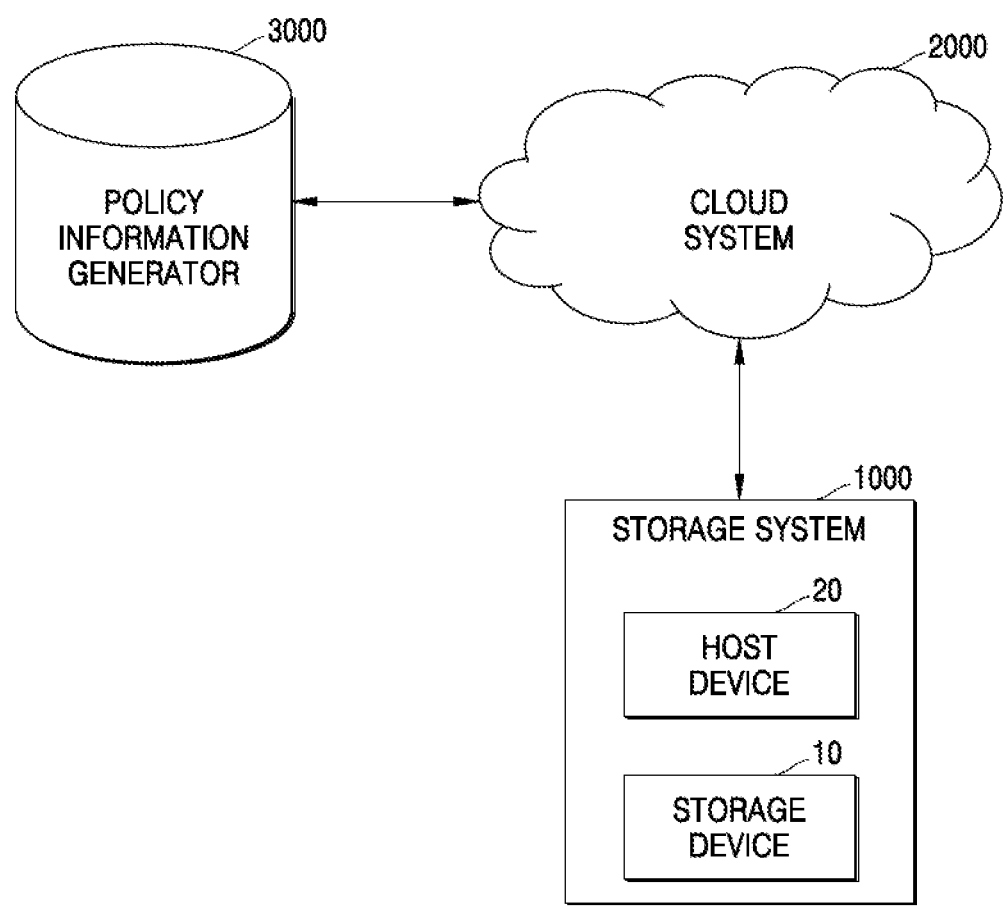
FIG. 9 illustrates another example of updating a policy according to an embodiment of the present disclosure.

FIG. 9 illustrates another example of updating a policy according to an embodiment of the present disclosure.

Referring to FIG. 9, a storage system 1000 may include the host device 20 and the storage device 10. For example, the storage system 1000 may correspond to the storage system 1000 shown in FIG. 2.

According to various embodiments of the present disclosure, the storage system 1000 may transmit a training data set to a cloud system 2000. The training data set may be data representing action information selected for each step and a change in the reward according to the action information while performing episodes illustrated in FIG. 8. For example, the training data set corresponding to a first episode of FIG. 8 may include data with respect to the action information and a change in the reward for each of four steps that proceed from the initial state $S_0$ to a fourth state $S_4$.

According to various embodiments of the present disclosure, the storage system 1000 may transmit the training data set to the cloud system 2000 according to a predefined period. For example, the storage system 1000 may transmit the training data set at each time when each episode ends. Referring to FIG. 8, the number of training data sets transmitted to the cloud system 2000 may be n because the storage system 1000 may transmit the training data set at each endpoint of the first to nth episodes. As another example, the storage system 1000 may transmit the training data set to the cloud system 2000 at each predefined time. In this case, the time when the training data set is transmitted to the cloud system 2000 may not coincide with the end time of an episode.

According to various embodiments of the present disclosure, a policy information generator 3000 may receive the training data set from the cloud system 2000. The policy information generator 3000 may include the same or similar configuration as the RL learning unit 123_2 shown in FIG. 3B. For example, the policy information generator 3000 may refer to a cloud computing IP for updating the policy information even when the storage system 1000 does not include the RL learning unit 123_2. For example, the storage system 1000 that transmits the training data set to the cloud system 2000 may not include the RL learning unit 123_2. The storage system 1000 may perform stream classification for optimization of a target performance indicator with respect to input user data using the RL inference unit 123_1 without including the RL learning unit 123_2. As a result, the overall load of the storage system 1000 may be reduced.

The policy information generator 3000 may generate and update the policy information based on the training data set received from the cloud system 2000. Referring to FIG. 8, the policy information generator 3000 may receive a training data set corresponding to the first episode and generate policy information based on the training data set. The policy information generator 3000 may update the policy information when receiving the training data sets of the second episode to the n–1th episode.

The policy information generator 3000 may transmit the policy information to the storage system 1000 through the cloud system 2000. The policy information is policy information reflecting a training data set for a plurality of episodes, and may be used to select an action capable of obtaining the maximum reward. The storage system 1000 may periodically receive the updated policy information by simply transmitting the training data set to the cloud system 2000, and the RL inference unit 123_1 may select the action based on the updated policy information.

While the inventive concept has been particularly shown and described with reference to embodiment of the present disclosure thereof, it will be understood that various changes in form and details may be made therein without departing from the spirit and scope of the claims.

What is claimed is:

1. An operating method of a storage controller supporting multi-stream operation, the operating method comprising:
   receiving user data and environmental information of a non-volatile memory;

obtaining logical-characteristic information and physical-characteristic information, wherein the physical characteristic information is obtained for each of a plurality of physical streams;

defining a current state based on the logical-characteristic information and the physical-characteristic information;

obtaining an expectation value for each of the plurality of physical streams based on policy information and the current state;

selecting a physical stream corresponding to a maximum value among the expectation values for the plurality of physical streams; and performing a write operation on the user data through the selected physical stream.

2. The operating method of claim 1, wherein the logical-characteristic information is obtained based on the user data and comprises at least range information of a logical block address (LBA) of the user data, bandwidth information, or size information of an average page.

3. The operating method of claim 1, wherein the physical-characteristic information is obtained based on the environmental information and comprises at least overwritten ratio information, valid page count (VPC) information, LBA range information of stored data, number information of superblocks, sequential address ratio (SAR) information, terabyte written (TBW) information, number information of bad blocks or read/write request ratio information.

4. The operating method of claim 1, wherein the policy information comprises information for selecting a physical stream capable of realizing a maximum performance improvement in the current state, and is generated and updated by training a neural network.

5. The operating method of claim 4, wherein the neural network is based on at least one of Deep Q Network (DQN), Double DQN, and Dueling DQN.

6. The operating method of claim 1, wherein the expectation values are determined based on an improvement of a target performance indicator, and
wherein the target performance indicator corresponds to at least one piece of information of a VPC, a write amplification factor (WAF), a latency time and a bandwidth.

7. The operating method of claim 1, wherein the performing of the write operation on the user data comprises:
identifying a physical stream corresponding to the maximum value; and
adding a stream ID indicating the identified physical stream to the user data.

8. A storage controller comprising:
a multi-stream manager configured to generate a stream ID;
a characteristic information generator configured to receive user data and environmental information and generate logical-characteristic information and physical-characteristic information wherein the physical characteristic information is obtained for each of a plurality of physical streams; and
a reinforcement learning (RL) agent configured to define a current state based on the logical-characteristic information and the physical-characteristic information, obtain expectation values with respect to each of physical streams based on the current state and policy information with respect to a physical stream selectable in the current state, select a physical stream from among the plurality of physical streams corresponding to a maximum value among the expectation values, and perform a write operation on the user data through the selected physical stream.

9. The storage controller of claim 8, wherein the logical-characteristic information is obtained based on the user data and comprises at least range information of a logical block address (LBA) of the user data, bandwidth information, and size information of an average page.

10. The storage controller of claim 8, wherein the physical-characteristic information is obtained based on the environmental information and comprises at least overwritten ratio information, valid page count (VPC) information, LBA range information of stored data, number information of superblocks, sequential address ratio (SAR) information, terabyte written (TBW) information, number information of bad blocks and read/write request ratio information.

11. The storage controller of claim 8, wherein the RL agent comprises an RL learning unit configured to generate and update the policy information based on a training data set obtained by training a neural network.

12. The storage controller of claim 11, wherein the neural network is based on at least one of Deep Q Network (DQN), Double DQN, and Dueling DQN.

13. The storage controller of claim 8, wherein the expectation values are determined based on an improvement of a target performance indicator, and
wherein the target performance indicator corresponds to at least one piece of information of a VPC, a write amplification factor (WAF), a latency time and a bandwidth.

14. The storage controller of claim 8, wherein the RL agent is further configured to identify a physical stream corresponding to the maximum value, and
wherein the multi-stream manager is further configured to add a stream ID indicating the identified physical stream to the user data.

15. The storage controller of claim 11, further comprising a hardware intellectual property (IP) for an operation of the neural network,
wherein the hardware IP is implemented as a neural processing unit (NPU) or a neuromorphic computing unit.

16. The storage controller of claim 11, further comprising a policy information storage storing the policy information,
wherein the policy information is generated and updated by the RL learning unit, or is received from a cloud server.

17. A storage device for supporting multi-stream, the storage device comprising:
a first memory block;
a second memory block; and
a storage controller configured to transmit data to one of the first memory block and the second memory block according to a stream ID,
wherein the storage controller is further configured to receive user data from a host device, receive environmental information from each of the first memory block and the second memory block, generate logical-characteristic information and physical-characteristic information for the first memory block and the second memory block, define a current state based on the logical-characteristic information and the physical-characteristic information, obtain expectation values with respect to a selection of the first memory block and the second memory block based on the current state and policy information, selecting a memory block corresponding to a maximum value among the expectation values, and perform a write operation on the user data using the selected memory block.

18. The storage device of claim 17, wherein the logical-characteristic information is obtained based on the user data and comprises at least range information of a logical block address (LBA) of the user data, bandwidth information, and size information of an average page.

19. The storage device of claim 17, wherein the physical-characteristic information is obtained based on the environmental information, and comprises at least overwritten ratio information, valid page count (VPC) information, LBA range information of stored data, number information of superblocks, sequential address ratio (SAR) information, terabyte written (TBW) information, number information of bad blocks and read/write request ratio information.

20. The storage device of claim 19, wherein the environmental information is generated, in response to the first memory block and the second memory block receiving a monitoring command, and transmitted to the storage controller.

\* \* \* \* \*